H. WHISLER.
CHURN.
No. 55,407. Patented June 5, 1866.
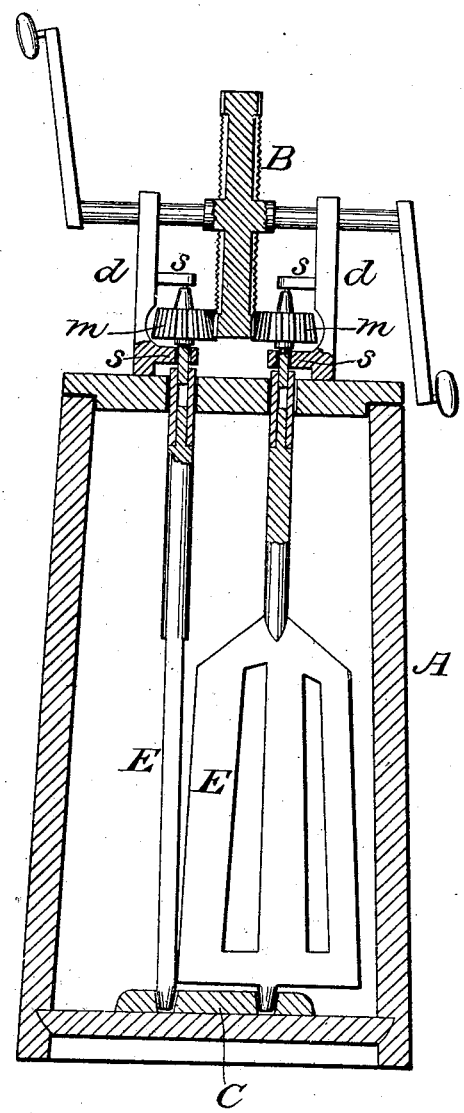

UNITED STATES PATENT OFFICE.

H. WHISLER, OF NEW MARKET, OHIO.

IMPROVEMENT IN CHURNS.

Specification forming part of Letters Patent No. 55,407, dated June 5, 1866.

*To all whom it may concern:*

Be it known that I, H. WHISLER, of the county of Highland in the State of Ohio, have made certain new and useful Improvements in Churns; and I hereby declare that the following is a true, full, and exact description of the same, reference being had to the accompanying drawings and to the letters of reference marked thereon.

Figure 1 in the annexed drawings represents a vertical section of the body of my churn, and also of the wheels and dashers. The body of the churn is cylindrical in form, and similar to those in common use.

The letter B, which designates the driving-wheel, and intended to give motion to the dashers, is double-faced, with cogs on each face, and hung on an axle extending out far enough to have a crank attached to each end. The axle of wheel B rests on the two uprights $d$, which rest on the top of the churn A. From the inner sides of uprights $d$ extend two ears, $s$, intended as bearings for the axles of the two spur-wheels $m$. The spur-wheels $m$ are geared into opposite faces of driving-wheel B.

The lower ends of the axles of $m$ have a socket in them to receive the upper ends of the rods to which the dashers E are attached. These rods at their lower ends rest in holes in the bar C, which is fastened to the bottom of churn A.

The dashers E consist of two oblong boards a little wider at bottom than at top, each having two longitudinal openings in them to admit of the free passage of the milk through them when they are in rapid motion.

In operating my churn it will be seen that the spur-wheels $m$ have the same inward motion toward a vertical line drawn through the center of the churn A, and that the dashers having the same motion the milk will be thrown violently from each dasher against the other, as well as against the sides of the churn, thus greatly increasing the agitation of the milk.

The great advantage which I claim for my invention is its easy adaptation to the cylindrical churn generally used in the country, and thereby saving both time and expense.

Having thus described my invention, what I claim, and desire to secure by Letters Patent, is—

The combination of the wheels B and $m$, the ears $s$, and the dashers E, the whole constructed and operating in the manner and for the purpose herein set forth.

In testimony that I claim the foregoing as my own, I hereby affix my signature in the presence of two witnesses.

H. WHISLER.

Witnesses:
J. C. STINE,
M. WHISLER.